(12) United States Patent
Kakiuchi et al.

(10) Patent No.: US 6,514,409 B2
(45) Date of Patent: Feb. 4, 2003

(54) HOLLOW FIBER MEMBRANE MADE OF AN ETHYLENE-VINYL ALCOHOL POLYMER

(75) Inventors: Tomoki Kakiuchi, Kurashiki (JP); Koji Sekiguchi, Kurashiki (JP); Takeshi Suehiro, Kurashiki (JP); Shuhei Nakaji, Kurashiki (JP); Yoichi Matsumoto, Kurashiki (JP); Masato Takai, Kurashiki (JP); Nozomu Sugo, Kurashiki (JP); Hitoshi Tsuruta, Kurashiki (JP)

(73) Assignee: Kuraray Co., Ltd., Kurashiki (JP)

( * ) Notice: Subject to any disclaimer, the term of this patent is extended or adjusted under 35 U.S.C. 154(b) by 0 days.

(21) Appl. No.: 09/756,777

(22) Filed: Jan. 10, 2001

(65) Prior Publication Data

US 2001/0015335 A1 Aug. 23, 2001

(30) Foreign Application Priority Data

Feb. 4, 2000 (JP) ........................................ 2000-027751

(51) Int. Cl.$^7$ ........................... B01D 69/08; B01D 71/76
(52) U.S. Cl. .............................. 210/500.23; 210/500.1; 210/500.21; 210/500.27
(58) Field of Search .................... 210/500.1, 500.21, 210/500.23, 500.36, 500.42, 500.27

(56) References Cited

U.S. PATENT DOCUMENTS 4,269,713 A * 5/1981 Yamashita et al. ..... 210/500.23
4,385,094 A * 5/1983 Tanaka et al. ......... 210/500.23

FOREIGN PATENT DOCUMENTS

| EP | 0 747 113 | 12/1996 |
|----|-----------|---------|
| JP | 58036602  | 3/1980  |
| JP | 58045239  | 3/1983  |
| JP | 05042208  | 2/1993  |

OTHER PUBLICATIONS

Science Forum, p. 145, printed in 1987 (No Translation).
Zborowski et al, "Pore size and temperature effects in membrane separation of albumin from immunoglobulins.", Jul.–Sep. 1990, Database Accession No.: NLM2252796, XP–002207198.

* cited by examiner

*Primary Examiner*—John Kim
(74) *Attorney, Agent, or Firm*—Oblon, Spivak, McClelland, Maier & Neustadt, P.C.

(57) ABSTRACT

A hollow fiber membrane made of an ethylene-vinyl alcohol polymer, comprises a dense layer existing in the inner surface and a porous layer existing in the layer other than the dense layer, wherein the hollow fiber membrane has a porosity of 60 to 90%, an overall mass transfer coefficient for myoglobin in a water-based system of not less than 0.003 cm/min., and a rejection rate for albumin in a bovine blood system of not less than 97%. The EVA hollow fiber membrane is useful for hemopurification membranes such as hemodialysis membranes, hemodiafiltration membranes, hemofiltration membranes and continuous hemofiltration membranes, and a process for producing the same.

8 Claims, No Drawings

HOLLOW FIBER MEMBRANE MADE OF AN ETHYLENE-VINYL ALCOHOL POLYMER

BACKGROUND OF THE INVENTION

1. Field of the Invention

The present invention relates to a hollow fiber membrane made of an ethylene-vinyl alcohol polymer (hereinafter the term "ethylene-vinyl alcohol" is simply referred to as "EVA," and the term "hollow fiber membrane made of an EVA polymer" is simply referred to as "EVA hollow fiber membrane"), and a process for producing the hollow fiber membrane. More particularly, the present invention related to an EVA hollow fiber membrane used for hemopurificafion membranes such as hemodialysis membranes, hemodiafiltration membranes, hemofiltration membranes and continuous hemofiltration membranes, and a process for producing the same.

2. Discussion of the Related Art

Hollow fiber membranes made of an EVA polymer have been widely used in applications for various separation membranes for industrial, medical and other purposes since the hollow fiber membranes are excellent in hydrophilicity (see Japanese Patent Laid-Open No. Hei 5-42208). Especially, the hollow fiber membranes are excellent in biocompatibility and chemical stability, and have very little eluted substances, so that the hollow fiber membranes have been widely used for medical applications. Their representative uses include, for instance, hemodialysis filtration membranes.

Japanese Examined Patent Publication No. Sho 58-36602, Japanese Patent Laid-Open Nos. Sho 58-45239 and Hei 5-42208, and the like disclose membranes having an asymmetric structure comprising a dense layer in the inner surface predominantly imparting fractionalization and permeability, and a porous layer supporting the dense layer as an EVA hollow fiber membrane having both high permeability and high fractionalization.

Recently, it has been greatly desired to remove by dialysis not only low molecular weight substances (molecular weight: less than 1000) such as urea and creatinine but also moderate or high molecular weight substances (molecular weight: 1000 to 40000 or so) represented by, for instance, $\beta_2$-microglobulin (molecular weight: 11800) (hereinafter simply referred to as "$\beta_2$-MG"). The EVA hollow fiber membrane having the above-mentioned asymmetric structure has been developed mainly for the purpose of eliminating the low molecular weight substances such as urea and creatinine contained in blood. Accordingly, the EVA hollow fiber membrane does not sufficiently satisfy the elimination for moderate or high molecular weight substances.

An object of the present invention is to provide an EVA hollow fiber membrane being excellent in elimination of moderate or high molecular weight substances and having little loss of albumin.

Another object of the present invention is to provide a process for producing the hollow fiber membrane.

These and other objects of the present invention will be apparent from the following description.

SUMMARY OF THE INVENTION

According to the present invention, there is provided a hollow fiber membrane made of an ethylene-vinyl alcohol polymer, comprising a dense layer existing in the inner surface and a porous layer existing in the layer other than the dense layer, wherein the hollow fiber membrane has a porosity of 60 to 90%, an overall mass transfer coefficient for myoglobin in a water-based system of not less than 0.003 cm/min., and a rejection rate for albumin in a bovine blood system of not less than 97%.

In a preferred embodiment of the EVA hollow fiber membrane, the clearance for urea in a bovine blood system is not less than 175 mL/min, and the clearance for $\beta_2$-microglobulin is not less than 35 mL/min per a membrane area of 1.6 m$^2$ at a blood flow rate of 200 mL/min and a dialysate flow rate of 500 mL/min.

Also, in another preferred embodiment of the EVA hollow fiber membrane, the hollow fiber membrane has a rate of pore area of not less than 30% at the depth of 1 $\mu$m from the inner surface, and a diameter of a nodule forming the dense layer of 5 to 50 nm.

In addition, the present invention provides a process for producing a hollow fiber membrane made of an ethylene-vinyl alcohol polymer, comprising the steps of extruding a dope for forming a membrane comprising an ethylene-vinyl alcohol polymer and a solvent from a double annular nozzle, with pouring a hollow forming agent in the internal side of the double annular nozzle, the dope being transparent and homogeneous at a high temperature but inducing phase separation when its temperature is lowered, passing the hollow fiber membrane extruded from the double annular nozzle through the air, and thereafter introducing the hollow fiber membrane into a water bath, wherein a temperature (° C.) of the dope for forming a membrane ($T_D$), a temperature (° C.) for phase separation (LST) and a temperature (° C.) of the air through which the hollow fiber membrane extruded from the double annular nozzle is passed ($T_A$) satisfy the following relationships:

$5 \leq LST \leq 40$, $T_D \leq LST+20$, and $T_A \leq LST$.

DETAILED DESCRIPTION OF THE INVENTION

In the EVA hollow fiber membrane of the present invention, the porous layer existing in the layer other than the dense layer has relatively large pores. The shape of the pores can be arbitrarily chosen, so long as its influence to the permeability is small. The shape can be any of network structure, macro-voids, and the like.

Since the porosity of the EVA hollow fiber membrane of the present invention is not less than 60%, the permeability of the moderate or high molecular weight substances is high. Also, since the porosity is not more than 90%, its mechanical strength is high. It is preferable that the porosity is 65 to 85%.

The porosity is calculated by the equation:

Porosity (%)=$(W_W-W_D)/\rho_W/W_D/\rho_E+(W_W-W_D)/\rho_W \times 100$, wherein $W_W$ is the weight of a water-containing membrane; $W_D$ is the weight of a dry membrane; $\rho_W$ is specific gravity of water; and $\rho_E$ is specific gravity of EVA.

The overall mass transfer coefficient for myoglobin of the EVA hollow fiber membrane in a water-based system is not less than 0.003 cm/min, preferably not less than 0.005 cm/min, from the viewpoint of increasing the removing efficiency of the moderate or high molecular weight substances.

The rejection rate for albumin of the EVA hollow fiber membrane in a bovine blood system is not less than 97%, preferably not less than 98%, from the viewpoint of suppressing the leakage of proteins useful for human bodies to a minimal level.

In addition, the clearance for urea in a bovine blood system is preferably not less than 175 mL/min, more preferably not less than 180 mL/min, still more preferably not less than 185 mL/min per membrane area of 1.6 m² at a blood flow rate of 200 mL/min and a dialysate flow rate of 500 mL/min, from the viewpoint of increasing the removing efficiency of the low molecular weight substances.

The clearance for $\beta_2$-MG in a bovine blood system is preferably not less than 35 mL/min, more preferably not less than 40 mL/min, still more preferably not less than 45 mL/min per membrane area of 1.6 m² at a blood flow rate of 200 mL/min and a dialysate flow rate of 500 mL/min, from the viewpoint of increasing the removing efficiency of the moderate or high molecular weight substances.

In the present invention, the overall mass transfer coefficient for myoglobin, the rejection rate for albumin, the clearance for urea and the clearance for $\beta_2$-MG can be determined in accordance with the evaluation criteria for dialyzer property [authored by T. Satoh et al.: *Kakushu no Ketsuekijokaho no Kino to Tekio-Ketsuekijokaki no Seinohyokaho to Kinobunrui* (*Functions and Application of Various Methods for Hemopurification-Performance Evaluation Methods and Function Classifications of Hemopurification Devices*), Tosekikaishi, published by Shadanhojin Nippon Toseki Igakukai, 29(8), 1231 –1245, 1996].

The overall mass transfer coefficient for myoglobin is calculated from the clearance determined in a water-based system (filtration flow rate $Q_F'$=0 mL/min/m²) in accordance with the equation:

$$K \text{ (overall mass transfer coefficient for myoglobin) (cm/min)} = Q_B/A \times (1-Z) \times \ln(1-E \times Z)/(1-E)$$

wherein E=CL/$Q_B$ and Z=$Q_B$/$Q_D$, wherein CL is a clearance (mL/min), $Q_B$ is a flow rate (mL/min) at the inlet on the blood side, and $Q_D$ is a flow rate (mL/min) at the inlet on the dialysate side.

The rejection rate for albumin, the clearance for urea and the clearance for $\beta_2$-MG are determined in a bovine blood system ($Q_F'$=10 mL/min/m²).

In the EVA hollow fiber membrane of the present invention, it is preferable that the rate of pore area is not less than 30% at the depth of 1 μm from the inner surface, and that the diameter of a nodule forming the dense layer of the inner surface is 5 to 50 nm, from the viewpoint of giving high permeability of the moderate or high molecular weight substances. The rate of pore area is more preferably not less than 35%, and the diameter of a nodule forming the dense layer of the inner surface is more preferably within a range of 5 to 45 nm.

The rate of pore area can be determined by carrying out image analysis of a microphotograph (magnification: 60000) of the EVA hollow fiber membrane. Concretely, the rate of pore area is obtained by solidly painting out with a black ink the pores existing in the microphotograph of a cross section of the hollow fiber membrane at the depth of 1 μm from the inner surface, determining the pore area $S_1$ and the total area $S_2$ with an image processor, and calculating the rate of pore area on the basis of the following equation:

$$[\text{Rate of Pore Area}](\%) = (S_1/S_2) \times 100.$$

The nodule is composed of close packed particles of high molecular compounds. The nodule is observed as fibrillar fibers or particles arranged in the longitudinal direction of the hollow fiber membrane when its inner surface is observed by an atomic force microscope.

In the EVA hollow fiber membrane, the dense layer refers to a region having a pore size of 5 to 50 nm. The pore size of the dense layer is determined by observing the surface of the dense layer, i.e. the inner surface of the EVA hollow fiber membrane, with an electron microscope (magnification: 60000).

It is preferable that the thickness of the dense layer is within a range of 0.1 to 2 μm, from the viewpoint of being less likely to cause defects in the dense layer, and giving a high rejection rate for albumin and a high permeability of the moderate or high molecular weight substances. It is preferable that the thickness of the dense layer is 0.1 to 1 μm, from the viewpoint of securing an even higher permeability of the moderate or high molecular weight substances.

The shape of the EVA hollow fiber membrane is like a hollow tube. It is preferable that the membrane thickness of the EVA hollow fiber membrane is within a range of 3 to 2000 μm, more preferably within a range of 10 to 1000 μm, and still more preferably within a range of 10 to 400 μm, from the viewpoints of securing stringiness and mechanical strength, and securing removing efficiency of the moderate or high molecular weight substances. It is desired that the outer diameter of the EVA hollow fiber membrane is usually within a range of 40 to 5000 μm, preferably within a range of 40 to 3000 μm, and more preferably within a range of 100 to 1000 μm.

Next, the process for producing the EVA hollow fiber membrane will be described. First, the EVA polymer is dissolved in a solvent to give a dope for forming a membrane.

The EVA polymer can be any of random copolymers, block copolymers and graft copolymers of ethylene and vinyl alcohol. It is preferable that the EVA polymer has an ethylene content of 10 to 60% by mol, and a saponification degree of not less than 95% by mol, from the viewpoints of securing mechanical strength during wetting, and securing biocompatibility. The EVA polymer can be copolymerized with a copolymerizable monomer such as methacrylic acid, vinyl chloride, methyl methacrylate or acrylonitrile within the amount of not more than 15% by mol.

The solvent for dissolving the EVA polymer includes dimethyl sulfoxide (hereinafter referred to as DMSO), N,N-dimethylacetamide (hereinafter referred to as DMAc), N-methylpyrrolidone (hereinafter referred to as NMP), and mixed solvents containing those components. Among them, DMSO is preferable from the viewpoints of readily capable of obtaining an EVA hollow fiber membrane having a membrane structure and physical properties desired in the present invention, and having relatively low toxicity.

The concentration of the EVA polymer in the dope for forming a membrane is preferably within a range of 5 to 50% by weight, more preferably within a range of 10 to 30% by weight. When the concentration is too high, it tends to lower the permeability of the moderate or higher molecular substances. Also, when the concentration is too low, it tends to lower the stringiness of the hollow fiber membrane, because the viscosity of the dope is lowered, and it tends to lower the mechanical strength of the hollow fiber membrane.

An additive can be added to the dope for forming a membrane for the purposes of adjusting the phase separation temperature and viscosity. The additive includes water; alcohols such as methanol, ethanol, glycerol, ethylene glycol and diethylene glycol; ketones such as acetone and methyl ethyl ketone; high molecular weight compounds such as polyethylene glycols, chitosan, chitin, dextran and polyvinyl pyrrolidones; salts such as lithium chloride, sodium chloride, calcium chloride, lithium acetate, sodium sulfate and sodium hydroxide; and the like. Among them, water, which is free from volatility and toxicity, is preferable. In addition, in order to form a desired dense layer on the inner surface, it is preferable to use a lithium salt such as lithium chloride or lithium acetate.

The dope for forming a membrane is transparent and homogeneous at high temperatures, but induces phase separation when the temperature is lowered. It is preferable that the temperature at which the phase separation is induced (this temperature being simply hereinafter referred to as "LST") is adjusted to $5 \leq LST \leq 40$ (° C.). In order to adjust the LST as specified above, it is preferable that the concentration of the additive in the dope for forming a membrane is not more than 20% by weight. When the concentration is too high, it tends to be difficult to obtain a desired LST, and the EVA polymer sometimes would not be dissolved in the dope. The LST is more preferably within a range of 10° to 40° C., still more preferably within a range of 15° to 40° C. The LST referred to herein is a temperature at which the dope for forming a membrane becomes clouded when the temperature is lowered at a rate of 1° C. per minute from 90° C.

In order to obtain the EVA hollow fiber membrane having a desired membrane structure and physical properties required in the present invention, the process for forming a membrane is preferably a dry-wet process. According to the dry-wet process, the EVA hollow fiber membrane is obtained by extruding the dope for forming a membrane from a double annular nozzle to the air, with pouring a hollow forming agent in the internal side of the double annular nozzle; coagulating the extruded product from its inner surface to form a dense layer in the inner surface; and thereafter introducing the extruded product into a water bath. In a membrane formed by a wet process comprising directly extruding the dope for forming a membrane into a water bath to coagulate the extruded product, since coagulation occurs from the outer surface as well as from the inner surface, the dense layer is likely to be also formed in the outer surface.

It is preferable that the temperature of the dope for forming a membrane ($T_D$), LST and the temperature of the air ($T_A$) through which the extruded product is passed satisfy the relationships of $T_D \leq LST+20$, and $T_A \leq LST$. When $T_D$, LST and $T_A$ satisfy the condition of $T_D > LST+20$ or $T_A > LST$, it tends to lower the rejection rate of albumin, and it tends to be difficult to form a membrane. It is more preferable that the above-mentioned temperature of the air ($T_A$) is not more than LST−5° C.

Since it is required that the coagulation is accelerated in order to form a desired dense layer in the inner surface, it is preferable to use a solution having a function of coagulating the EVA polymer as a hollow forming agent. The hollow forming agent can be used without any limitation, so long as the agent has a function of coagulating the EVA polymer, and has a miscibility with the above-mentioned solvent. As the hollow forming agent, a water-soluble medium is usually used. The hollow forming agent includes, for instance, water; mixtures of water and a solvent which is soluble in water, such as DMSO, DMAc, NMP or an alcohol; and the like. In addition, an aqueous solution containing an inorganic salt such as lithium chloride, sodium chloride, calcium chloride, lithium acetate, sodium sulfate or sodium hydroxide can be used as the hollow forming agent as occasion demands.

In general, the EVA hollow fiber membrane after completion of coagulation is subjected to a wet heat treatment. It is preferable that the temperature during the wet heat treatment is usually within a range of 40° to 80° C., preferably within a range of 55° to 70° C. When the temperature during the wet heat treatment is lower than the above range, it tends to lower the storage stability of the accuracy of dimension and physical properties after drying. Also, when the temperature exceeds the above range, it tends to cause the change in the membrane structure and its properties. The wet heat treatment can be usually carried out by a process comprising passing the EVA hollow fiber membrane through hot water which also acts as a rinsing water of the hollow fiber membrane. It is not necessarily required that the wet heat treatment and rinsing are simultaneously carried out. It is possible to carry out the wet heat treatment comprising passing the EVA hollow fiber membrane through saturated water vapor atmosphere, and thereafter rinsing the membrane. Conversely, it is possible that rinsing is firstly carried out, and thereafter the wet heat treatment is carried out. However, it is preferable that the wet heat treatment and rinsing are simultaneously carried out from the viewpoint of simplification of the process.

The EVA hollow fiber membrane in a wet state is dipped in a water-miscible volatile organic solvent to replace water which is present on the surface or in the internal of the membrane with the organic solvent, and thereafter dried at ordinary pressure or reduced pressure. In this case, it is preferable to use a lower aliphatic alcohol having 1 to 5 carbon atoms or a ketone as the organic solvent. Preferred organic solvents include, for instance, methanol, ethanol, amyl alcohol, acetone, methyl ethyl ketone, diethyl ketone, and the like. It is desirable that the temperature during drying is not more than 55° C., more preferably not less than 50° C. In addition, it is desirable that the water vapor pressure is not more than about 0.0027 MPa (20 mm Hg), preferably not more than about 0.0014 MPa (10 mm Hg). Under those conditions, the EVA hollow fiber membrane can be dried, with maintaining its physical properties in a wet state.

The EVA hollow fiber membrane after drying is subjected to a dry heat treatment. It is desirable that the temperature during the dry heat treatment is within a range of 30° to 70° C., preferably within a range of 30° to 65° C. When the temperature during the dry heat treatment exceeds the above range, it tends to generate the change in the membrane structure and its properties. Also, when the temperature is lower than the above range, it tends to be difficult to achieve sufficient thermal fixing, and thereby dimensional stability and storage stability would be impaired. It is preferable that the water vapor pressure of the atmosphere for the dry heat treatment is not more than about 0.0080 MPa (60 mm Hg). When the water vapor pressure exceeds the above upper limit, it tends to occur the adsorption of the water molecules to the EVA copolymer to cause the change in the membrane structure and its physical properties due to the desorption of water molecules when the EVA copolymer is exposed to an atmosphere of room temperature after the dry heat treatment.

Since the dried EVA hollow fiber membrane obtained in the manner described above is excellent in dimensional stability in a dry state, it is convenient for transportation. When rewetting the dried EVA hollow fiber membrane with water or physiological saline before use, its structure and physical properties before drying would reappear.

EXAMPLES

The present invention will be further specifically described by means of the following examples, without intending to limit the present invention to those examples.

Example 1

Fifteen parts by weight of an EVA polymer having an ethylene content of 32% by mole and a saponification degree of 99% (commercially available from Kuraray Co., Ltd, under the trade name: EVAL EC-F100A), 73 parts by weight of DMSO, 10 parts by weight of water and 2 parts by weight of lithium chloride were dissolved with heating at 90° C., to give a dope for forming a membrane. The LST of the resulting dope was 28° C. The dope was extruded at 40° C. from a double annular nozzle, with pouring water into the internal of the double annular nozzle. The extruded solution was passed through the air at 15° C. and introduced into a water bath. Subsequently, procedures of rinsing with water, wet heat treatment, drying, and dry heat treatment were carried out in accordance with an ordinary process, to give a dry hollow fiber membrane.

The resulting hollow fiber membrane had an outer diameter of 265 $\mu$m, an inner diameter of 175 $\mu$m, and a thickness of 45 $\mu$m. The conditions for forming a membrane are shown in Table 1, and the structure of the membrane was observed by an electron microscope (magnification: 60000) and an atomic force microscope, and physical properties of the membrane are shown in Table 2.

Example 2

A membrane was formed under the conditions for forming a membrane as shown in Table 1 using the same dope for forming a membrane as in Example 1, to give a dry hollow fiber membrane. Conditions other than those listed in Table 1 are the same as in Example 1.

The resulting hollow fiber membrane had an outer diameter of 265 $\mu$m, an inner diameter of 175 $\mu$m, and a thickness of 45 $\mu$m. The structure and physical properties of the membrane are as shown in Table 2.

Example 3

A dope for forming a membrane was prepared from 15 parts by weight of an EVA polymer having an ethylene content of 47% by mole and a saponification degree of 99% (commercially available from Kuraray Co., Ltd, under the trade name: EVAL ES-G110A), 78 parts by weight of DMSO, 5 parts by weight of water and 2 parts by weight of lithium chloride, and a membrane was formed using this dope under the conditions for forming a membrane as shown in Table 1, to give a dry hollow fiber membrane. Conditions other than those listed in Table 1 are the same as in Example 1.

The resulting hollow fiber membrane had an outer diameter of 265 $\mu$m, an inner diameter of 175 $\mu$m, and a thickness of 45 $\mu$m. The structure and physical properties of the membrane are shown in Table 2.

Example 4

A dope for forming a membrane was prepared from 16 parts by weight of an EVA polymer having an ethylene content of 47% by mole and a saponification degree of 99%, 83 parts by weight of DMSO and 1 part by weight of water, and a membrane was formed using this dope under the conditions for forming a membrane as shown in Table 1, to give a dry hollow fiber membrane. Conditions other than those listed in Table 1 are the same as in Example 1.

The resulting hollow fiber membrane had an outer diameter of 265 $\mu$m, an inner diameter of 175 $\mu$m, and a thickness of 45 $\mu$m. The structure and physical properties of the membrane are shown in Table 2.

Comparative Example 1

A dope for forming a membrane was prepared from 15 parts by weight of an EVA polymer having an ethylene content of 32% by mole and a saponification degree of 99%, 84 parts by weight of DMSO and 1 part by weight of water, and a membrane was formed using this dope under the conditions for forming a membrane as shown in Table 1, to give a dry hollow fiber membrane. Conditions other than those listed in Table 1 are the same as in Example 1.

The resulting hollow fiber membrane had an outer diameter of 265 $\mu$m, an inner diameter of 175 $\mu$m, and a thickness of 45 $\mu$m. The structure and physical properties of the membrane are shown in Table 2.

Comparative Examples 2 and 3

Each membrane was formed under the conditions for forming a membrane as shown in Table 1 using the same dope for forming a membrane as in Comparative Example 1, to give a dry hollow fiber membrane. Conditions other than those listed in Table 1 are the same as in Example 1.

Each of the resulting hollow fiber membranes had an outer diameter of 265 $\mu$m, an inner diameter of 175 $\mu$m, and a thickness of 45 $\mu$m. The structure and physical properties of the membranes are shown in Table 2.

Comparative Example 4

A dope for forming a membrane was prepared from 15 parts by weight of an EVA polymer having an ethylene content of 32% by mole and a saponification degree of 99%, 63 parts by weight of DMSO, 20 parts by weight of water and 2 parts by weight of lithium chloride, and a membrane was formed using this dope under the conditions for forming a membrane as shown in Table 1, to give a dry hollow fiber membrane. Conditions other than those listed in Table 1 are the same as in Example 1.

The resulting hollow fiber membrane had an outer diameter of 265 $\mu$m, an inner diameter of 175 $\mu$m, and a thickness of 45 $\mu$m. The structure and physical properties of the membrane are shown in Table 2.

Comparative Example 5

A membrane was formed under the conditions for forming a membrane as shown in Table 1 using the same dope for forming a membrane as in Example 3, to give a dry hollow fiber membrane. Conditions other than those listed in Table 1 are the same as in Example 1.

The resulting hollow fiber membrane had an outer diameter of 265 $\mu$m, an inner diameter of 175 $\mu$m, and a thickness of 45 $\mu$m. The structure and physical properties of the membrane are shown in Table 2.

TABLE 1

| | Conditions for Forming Membrane | | | |
|---|---|---|---|---|
| Ex. No. | LST [° C.] | Temp. of Dope [° C.] | Temp. of Air Passed [° C.] | Hollow-Forming Agent |
| 1 | 28 | 40 | 15 | Water |
| 2 | 28 | 30 | 20 | DMSO/Water = 15/85 (weight ratio) |
| 3 | 29 | 30 | 10 | Water |

TABLE 1-continued

Conditions for Forming Membrane

| Ex. No. | LST [° C.] | Temp. of Dope [° C.] | Temp. of Air Passed [° C.] | Hollow-Forming Agent |
|---|---|---|---|---|
| 4 | 20 | 30 | 15 | DMSO/Water = 30/70 (weight ratio) |
| Comp. Ex. 1 | 1 | 30 | (Wet type) | Nitrogen |
| Comp. Ex. 2 | 1 | 20 | (Wet type) | Water |
| Comp. Ex. 3 | 1 | 20 | 1 | Water |
| Comp. Ex. 4 | 58 | 85 | 30 | Water |
| Comp. Ex. 5 | 29 | 60 | 40 | Water |

TABLE 2

| | Physical Properties of Dense Layer | | | Physical Properties of Hollow Fiber Membrane | | | | |
|---|---|---|---|---|---|---|---|---|
| Ex. No. | Pore Size [nm] | Thickness [μm] | Diameter of Nodule [nm] | Rate of Pore Area [%] | Porosity [%] | Overall Mass Transfer Coefficient for Myoglobin [cm/min] | Rejection Rate for Albumin [%] | Clearance (mL/min) |
| | | | | | | | | Urea / $\beta_2$-MG |
| 1 | 16 | 0.8 | 28 | 36 | 72 | 0.0052 | 99 | 187 / 46 |
| 2 | 30 | 1.0 | 36 | 44 | 68 | 0.0062 | 98 | 190 / 48 |
| 3 | 20 | 0.5 | 18 | 50 | 78 | 0.0104 | 99 | 194 / 54 |
| 4 | 38 | 0.8 | 42 | 58 | 65 | 0.0084 | 98 | 191 / 50 |
| Comp. Ex. 1 | Could Not Be Confirmed | Could Not Be Confirmed | Could Not Be Confirmed | Could Not Be Confirmed | 48 | 0.0007 | 97 | 162 / 8 |
| Comp. Ex. 2 | 60 | 4.5 | 54 | 22 | 60 | 0.0020 | 97 | 168 / 12 |
| Comp. Ex. 3 | 62 | 3.4 | 52 | 27 | 65 | 0.0028 | 93 | 170 / 13 |
| Comp. Ex. 4 | 80 | 0.2 | 58 | 52 | 84 | 0.0110 | 88 | 188 / 50 |
| Comp. Ex. 5 | 68 | 2.8 | 56 | 60 | 85 | 0.0122 | 90 | 190 / 53 |

According to the present invention, there is obtained an EVA hollow fiber membrane comprising a dense layer existing in the inner surface and a porous layer existing in the layer other than the dense layer, which exhibits effects of high permeability of myoglobin, a representative moderate or high molecular weight substance, and high rejection rate for albumin.

EQUIVALENT

Those skilled in the art will recognize, or be able to ascertain using simple routine experimentation, many equivalents to the specific embodiments of the invention described in the present specification. Such equivalents are intended to be encompassed in the scope of the present invention as recited in the following claims.

What is claimed is:

1. A hollow fiber membrane made of an ethylene-vinyl alcohol polymer, comprising a dense layer existing in the inner surface and a porous layer existing in the layer other than said dense layer, wherein said hollow fiber membrane has a porosity of 60 to 90%, an overall mass transfer coefficient for myoglobin in a water-based system of not less than 0.003 cm/min., and a rejection rate for albumin in a bovine blood system of not less than 97%, wherein said dense layer has a pore size of 5 to 50 nm and a thickness within a range of 0.1 to 2 μm.

2. The hollow fiber membrane according to claim 1, wherein the clearance for urea in a bovine blood system is not less than 175 mL/min and the clearance for $\beta_2$-microglobulin is not less than 35 mL/min per membrane area of 1.6 m$^2$ at a blood flow rate of 200 mL/min and a dialysate flow rate of 500 mL/min.

3. The hollow fiber membrane according to claim 1 or 2, wherein said hollow fiber membrane has a rate of pore area of not less than 30% at the depth of 1 μm from the inner surface, and a diameter of a nodule forming said dense layer of 5 to 50 nm.

4. The hollow fiber membrane according to claim 1 or 2, wherein said hollow fiber membrane has a rate of pore area not less than 35%, and the diameter of a nodule forming said dense layer of 5 to 45 nm.

5. The hollow fiber membrane according to claim 1, wherein said thickness of said dense layer is 0.1 to 1 μm.

6. The hollow fiber membrane according to claim 1, wherein said hollow fiber membrane is a hollow tube having a membrane thickness within a range of 3 to 2000 μm and an outer diameter within a range of 40 to 5000 μm.

7. The hollow fiber membrane according to claim 1, wherein said ethylene-vinyl alcohol polymer is selected from the group consisting of random copolymers, block copolymers and graft copolymers of ethylene and vinyl alcohol.

8. The hollow fiber membrane according to claim 1, wherein said ethylene-vinyl alcohol polymer has an ethylene content of 10 to 60% by mol, and a saponification degree of not less than 95% by mol.

* * * * *